US007345593B2

(12) United States Patent
Park et al.

(10) Patent No.: US 7,345,593 B2
(45) Date of Patent: Mar. 18, 2008

(54) APPARATUS FOR IMPLEMENTING UNIVERSAL REMOTE CONTROLLER AND METHOD THEREOF

(75) Inventors: Sun Bock Park, Cheongju-si (KR); Joo Won Kim, Gumi-si (KR)

(73) Assignee: LG Electronics Inc., Seoul (KR)

( * ) Notice: Subject to any disclaimer, the term of this patent is extended or adjusted under 35 U.S.C. 154(b) by 333 days.

(21) Appl. No.: 10/980,872

(22) Filed: Nov. 4, 2004

(65) Prior Publication Data

US 2005/0119770 A1 Jun. 2, 2005

(30) Foreign Application Priority Data

Nov. 5, 2003 (KR) ..................... 10-2003-0077974

(51) Int. Cl.
*G08C 19/00* (2006.01)
*G05B 19/02* (2006.01)
*G05B 19/18* (2006.01)

(52) U.S. Cl. .......................... 340/825.72; 340/825.24; 340/825.69; 700/65; 700/66

(58) Field of Classification Search ........... 340/825.72, 340/825.24, 825.69; 700/65, 66, 70
See application file for complete search history.

(56) References Cited

U.S. PATENT DOCUMENTS

| | | | | |
|---|---|---|---|---|
| 5,659,883 | A * | 8/1997 | Walker et al. | 455/59 |
| 6,636,157 | B1 * | 10/2003 | Sato | 340/825.22 |
| 6,791,467 | B1 * | 9/2004 | Ben-Ze'ev | 340/825.69 |
| 6,882,334 | B1 * | 4/2005 | Meyer | 345/156 |
| 6,906,635 | B1 * | 6/2005 | Moutaux et al. | 340/825.22 |
| 6,919,790 | B2 * | 7/2005 | Kanazawa | 340/5.21 |
| 6,987,462 | B2 * | 1/2006 | Bae et al. | 340/825.72 |
| 2004/0155793 | A1 * | 8/2004 | Mui | 340/825.69 |

* cited by examiner

*Primary Examiner*—Jeffery Hofsass
*Assistant Examiner*—Scott Au
(74) *Attorney, Agent, or Firm*—Ked & Associates, LLP

(57) ABSTRACT

The present invention provides an apparatus for implementing a universal remote controller and method thereof, by which a multitude of electronic products can be controlled by one remote controller. In a system including an electronic product module storing each remote controller control information of at least one or more products to output the stored remote controller control information according to an external request signal and a remote controller module receiving remote controller control information from the electronic product module and controlling a specific product selected by a user using the received remote controller control information, the present invention receives the remote controller control information from the electronic product module to display a key arrangement plan of the product to be controlled by a user's selection based on the received control information and then outputs key information by selecting a key of the displayed key arrangement plan. Therefore, the present invention facilitates to control a plurality of the electronic products using one remote controller.

21 Claims, 14 Drawing Sheets

Fig.4

| R/C Key | Unique ID NO of R/C Key | TV 1 | VTR/ DVD | Refrig -erator | TV2 (VCR built-in) | Air conditioner |
|---|---|---|---|---|---|---|
| Volume+ | 1 | 31 | 41 | 15 | 20 | 31 |
| Volume- | 2 | 32 | 42 | 16 | 21 | 32 |
| OK | 3 | 33 | 44 | 20 | 22 | X |
| Channel+ | 4 | 34 | 45 | 15 | 23 | 31 |
| Channel- | 5 | 35 | 46 | 16 | 24 | 32 |
| Menu | 6 | 36 | 30 | 21 | 25 | 20 |
| EXIT | 7 | 37 | 31 | 22 | 26 | 40 |
| Number KEY | 8 | 0-9 | 0-9 | 0-9 | 10-19 | 0-9 |
| Auto video | 9 | 40 | X | X | 27 | X |
| Play | 10 | X | 31 | X | 28 | X |
| Rewind | 11 | X | 32 | X | 29 | X |
| Record | 12 | X | 33 | X | 30 | X |
| Power | 13 | 45 | 30 | X | 21 | 45 |

APPARATUS FOR IMPLEMENTING UNIVERSAL REMOTE CONTROLLER AND METHOD THEREOF

BACKGROUND OF THE INVENTION

1. Field of the Invention

The present invention relates to an apparatus for implementing a universal remote controller and method thereof, by which various kinds of electronic products can be controlled in a manner that a remote controller unit of the apparatus receives remote controller control information for the various kinds of electronic products from electronic product units of the various kinds of electronic products, respectively.

2. Discussion of the Related Art

Generally, various kinds of electronic products such as TV, VTR, air conditioner, and the like employ remote controllers to facilitate their functional operations, respectively.

In case of using a remote controller, a specific function of a corresponding product can be automatically executed in a distance instead of pressing a key installed at the corresponding product directly. Hence, user's convenience can be maximized.

Recently, there exist various kinds of electronic home appliances. Moreover, various A/V devices including VCR, DVD, DTV set-top box, etc. are connected to such a display device as TV to use.

Moreover, a plurality of electronic products are mutually connected to each other as a home theater for embodying a personal theater, a home network system, and the like are popularized.

For such reasons, a universal or multi remote controller enabling to control various kinds of electronic home appliances has been developed and now popularized.

FIG. 1 is a block diagram of configurations of a general remote controller module and an electronic product module controlled by the remote controller module.

Referring to FIG. 1, in a remote controller module 10 according to a related art, once a user inputs a specific key signal via a key input unit 11 to control a specific operation of an electronic product designated by a user, a converter/generator (not shown in the drawing) generates a code corresponding to the inputted key signal under the control of a remote controller control unit 12.

An infrared transmitting unit 13 outputs an infrared signal corresponding to the code generated from the remote controller control unit 12 to an electronic product module 20. Information for controlling electronic products and the like is stored in a memory unit 14.

Basically in the electronic product module 20, an infrared receiving unit 21 receives the infrared signal transmitted from the infrared transmitting unit 13 of the remote controller module 10 and converts the received signal to an electrical signal to output.

Subsequently, a system control unit 22 receives the electrical signal outputted from the infrared receiving unit 21, demodulates the received electrical signal into the corresponding code in a converting unit (not shown in the drawing), and then controls an overall system to enable the product operation corresponding to the demodulated code.

In case of universal remote controller manufactured for the purpose of controlling a plurality of electronic products, various key codes of a plurality of usable electronic products are stored therein by a manufacturer.

Hence, one remote controller enables to control a plurality of electronic products through a mode selection in a manner of setting up various kinds of product information for manufacturers, model names, and the like of the corresponding electronic products to be controlled.

In case of intending to control a specific product using the remote controller, once a predefined ‘product selection’ key of the electronic product module including the information of a plurality of the products, the electronic product module displays the products thereon by a turn method. When the information of the specific product is displayed, a user selects it to control the specific product. Such a process or operation is called ‘mode selection’ or ‘mode switching’.

Yet, in such a method, a user is troubled with a job of directly setting up the manufacturer and model names of the entire electronic products to be controlled. There is a limit to the electronic product selection through the mode switching. And, operational key buttons for a plurality of electronic products, e.g., TV, air conditioner, refrigerator, etc., are not compatible with each other. Hence, more confusion and inconvenience are caused to the user.

In order to solve the aforesaid problems, a following method is proposed. First of all, while key codes of all usable electronic products are stored, key code values are simultaneously outputted from a remote controller module without user's mode switching so that a specific electronic product can receive its corresponding key code only to process.

However, the proposed method is effective only if key codes of the electronic products are different from each other. Substantially, a large memory volume is needed to store various kinds of product information for a number of manufacturers and electronic products in a single remote controller. Hence, the corresponding product cost is raised.

Moreover, in case of a plurality of electronic products provided within a home and a plurality of remote controllers controlling the electronic products, respectively, the number of the remote controllers rises. And, a user may have difficulty in finding the corresponding one of the remote controllers.

To overcome such problems, a remote controller generates an alarming sound to notify its location by receiving data from an electronic product module if the electronic product module transmits the data to the remote controller module.

Namely, it facilitates to find out the location of the specific remote controller using the remote controller module enabling data transmission/reception.

However, in such a case, a plurality of remote controllers should be provided one by one to a plurality of electronic products, respectively. Since each of the remote controllers uses a battery power, it should maintain a standby mode to receive wireless data outputted from the corresponding electronic products to shorten battery endurance thereof.

SUMMARY OF THE INVENTION

Accordingly, the present invention is directed to an apparatus for implementing a universal remote controller and method thereof that substantially obviate one or more problems due to limitations and disadvantages of the related art.

An object of the present invention is to provide an apparatus for implementing a universal remote controller and method thereof, by which a multitude of electronic products can be controlled by one remote controller using remote controller information received from each electronic product module.

Another object of the present invention is to provide an apparatus for implementing a universal remote controller and method thereof, by which all kinds of remote controller information stored/updated in an electronic product module are outputted by pressing a specific key, e.g., an update key, configured in a remote controller module in case of intending to update the remote controller control information of the remote controller module.

Another object of the present invention is to provide an apparatus for implementing a universal remote controller and method thereof, in which entire remote controller control information outputted from an electronic product module is stored so that products can be displayed thereon by a user's specific key input, e.g., a key input of product selection and in which a specific one of the displayed products is selected so that a specific function of the selected product can be controlled by displaying a key layout according to the stored remote controller control information.

Another object of the present invention is to provide an apparatus for implementing a universal remote controller and method thereof, in which an electronic product module is linked to an external network to update current remote controller control information.

A further object of the present invention is to provide an apparatus for implementing a universal remote controller and method thereof, by which a remote controller module enables to update remote controller control information having been updated in an electronic product module.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an apparatus for implementing a universal remote controller according to the present invention includes an electronic product module storing each remote controller control information of at least one or more products to output the stored remote controller control information according to an external request signal and a remote controller module receiving remote controller control information from the electronic product module and controlling a specific product selected by a user using the received remote controller control information.

In another aspect of the present invention, in a remote controller implementing method of a system including an electronic product module including a plurality of products and a remote controller module controlling the electronic product module, a method of controlling a universal remote controller includes the steps of receiving remote controller control information from the remote controller module, displaying a key arrangement plan of the product to be controlled by a user's selection based on the received control information, and outputting key information by selecting a key of the displayed key arrangement plan.

Therefore, the present invention facilitates to control electronic products via one remote controller.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 4 is a table of an information structure of remote controller control information stored in a memory unit of an electronic product module to be transmitted to a remote controller module;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
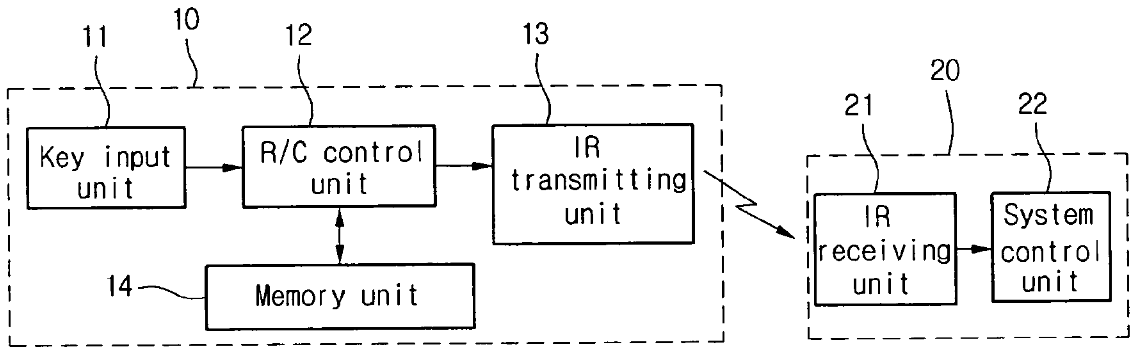
Fig.1 (Related Art)
FIG. 1 is a block diagram of configurations of a general remote controller module and an electronic product module controlled by the remote controller module.
Figure 2:
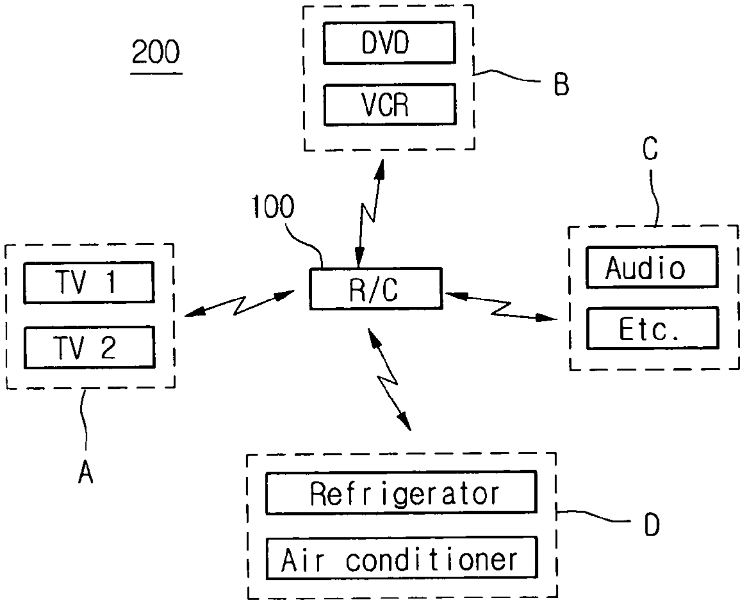
FIG. 2 is a block diagram of a universal remote controller according to the present invention.

FIG. 2 is a block diagram of a universal remote controller according to the present invention.

Referring to FIG. 2, a universal remote controller according to the present invention includes an electronic product module 200 outputting its remote controller control information according to an external request signal and a remote controller module 100 transmitting a remote controller control information (e.g., unique remote controller key identification number, product code information, etc.) request signal to the electronic product module 200 according to a user's request, changing a key arrangement plan to correspond to that of a user selected product for a remote controller control based on the received remote controller control information, and then controlling the electronic product according to the changed key arrangement plan.

In accordance with a user's setup, products stored in the electronic product module, as shown in the drawing, can be displayed as groups A, B, C, and D.

And, the electronic product module is connected to an external network (not shown in the drawing) to update current remote controller control information and the like.

Figure 3:
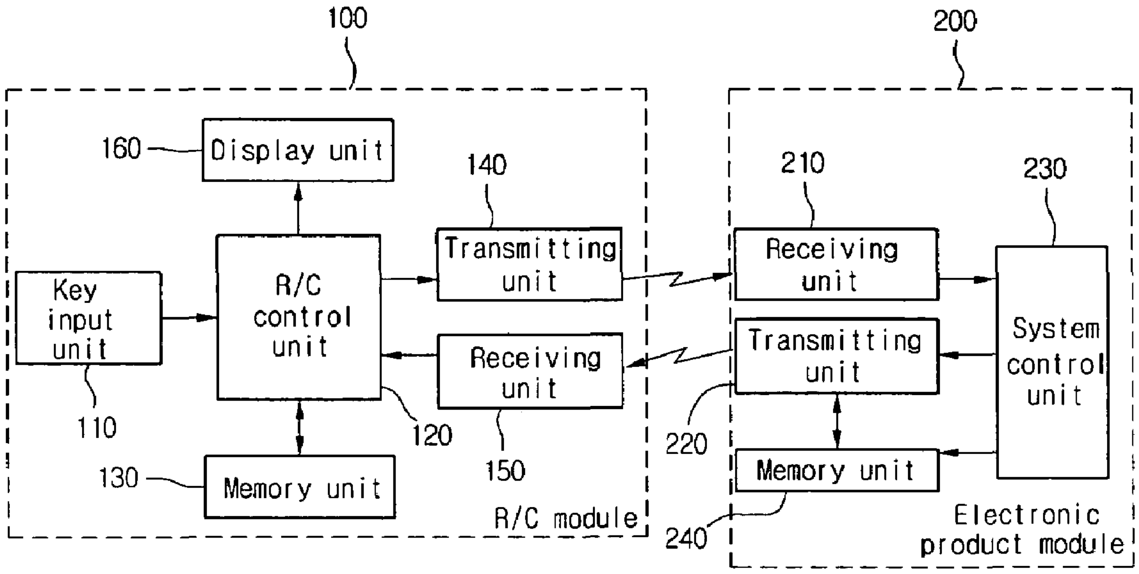
FIG. 3 is a block diagram of configurations of a universal remote controller module and an electronic product module controlled by the universal remote controller module according to the present invention.

FIG. 3 is a block diagram of configurations of the remote controller module 100 and the electronic product module 200 according to the present invention.

Referring to FIG. 3, the electronic product module 200 includes a receiving unit 210 receiving at least one remote controller control information request signal and at least one key code from the remote controller module 100, a transmitting unit 220 transmitting at least one remote controller control information of product code information, key code data, key arrangement state information and the like, a memory unit 240 storing the remote controller control information of each product, and a system control unit 230 connected to the receiving, transmitting, and memory units to output the stored remote controller control information according to the request signal from the remote controller module 100 and controlling a system to perform an operation corresponding to the received key code.

And, the electronic product module 200 further includes a converting/generating unit (not shown in the drawing) converting the received information to generate information.

The remote controller module 100 includes a transmitting unit 140 transmitting the at least one remote controller control signal and the at least one key code to the electronic product module according to a user's input, a receiving unit 150 receiving the remote controller control information transmitted from the electronic product module, a memory unit 130 storing the remote control information for at least one electronic product, a display unit 160 displaying a key arrangement plan corresponding to the remote controller control information of the electronic product to be controlled by the user or a product selected by the user from the electronic products, and a remote controller control unit 120 receiving the remote controller control information from the receiving unit to store in the memory unit, changing a current code and key arrangement plan based on the remote controller control information of the product selected by the user, and then outputting the key code to the electronic product module 200.

And, the remote controller module 100 includes a converting/generating unit (not shown in the drawing) converting the received information to generate information or outputting information corresponding to the key information inputted by the user.

Moreover, the remote controller control information received by the remote controller module from the electronic product module is executed by the user's request through the input of a predefined specific key, e.g., an update key, in general or can be automatically received on booting the corresponding product of the electronic product module.

Besides, usages of keys differently configured in the display unit 160 of the remote controller module according to the products are set up according to operations or control characteristics of the selected products based on the remote controller control information, respectively.

Meanwhile, the remote controller module generally displays home appliances controllable by the remote controller thereon. Optionally, the products can be grouped to be displayed on the display unit 160 as well.

FIG. 4 is a table of an information structure of remote controller control information (e.g., unique remote controller key identification number, product code, etc.) stored in the memory unit 240 of the electronic product module 200 to be transmitted to the remote controller module 100.

Referring to FIG. 4, in case that there exists key code information for various products and functions like an example of a per remote controller product command, remote controller control information including unique identification number of a remote controller key, a code of an electronic product, and the like for example is transmitted to the remote controller module.

The remote controller module transmits unique product information and command for a remote controller control. The electronic product module confirms the unique product information and then decodes the contents of the command to recognize what kind of command is inputted.

It is able to set the per remote controller product command in FIG. 4 for another product as well as the listed products. And, an operation of a remote controller key can be differently set for each product.

For instance, a menu key of an air conditioner is used as a temperature setting menu and volume keys thereof can be set for temperature setting.

Figure 6:
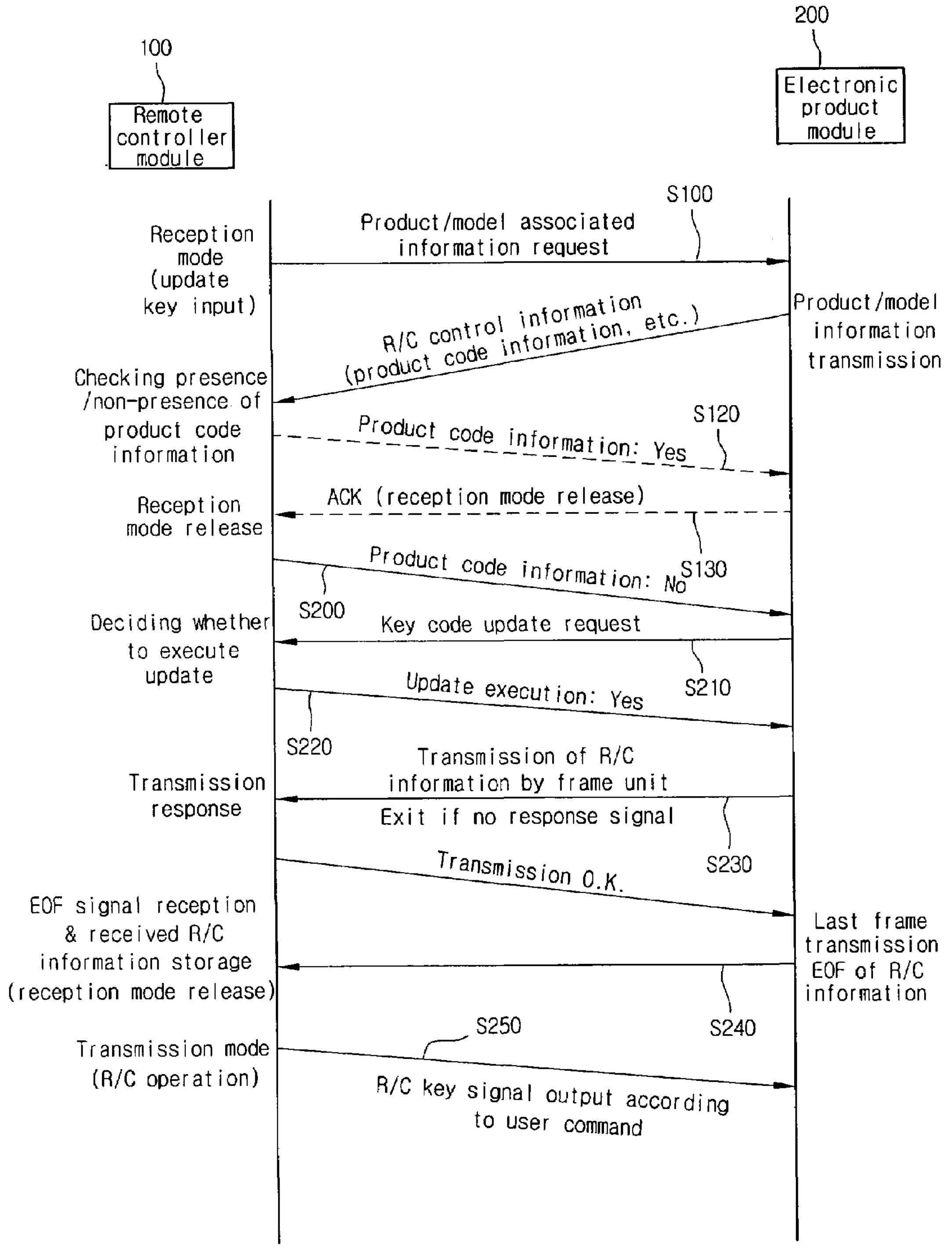
FIG. 6 is a flowchart of a signal sequence for a method of implementing a unified remote controller according to the present invention.

In the table of FIG. 6, a character X for each product indicates a function currently unsupportable by the corresponding product. Yet, such a function becomes usable in case of adding or changing functions and the like.

Figure 5:
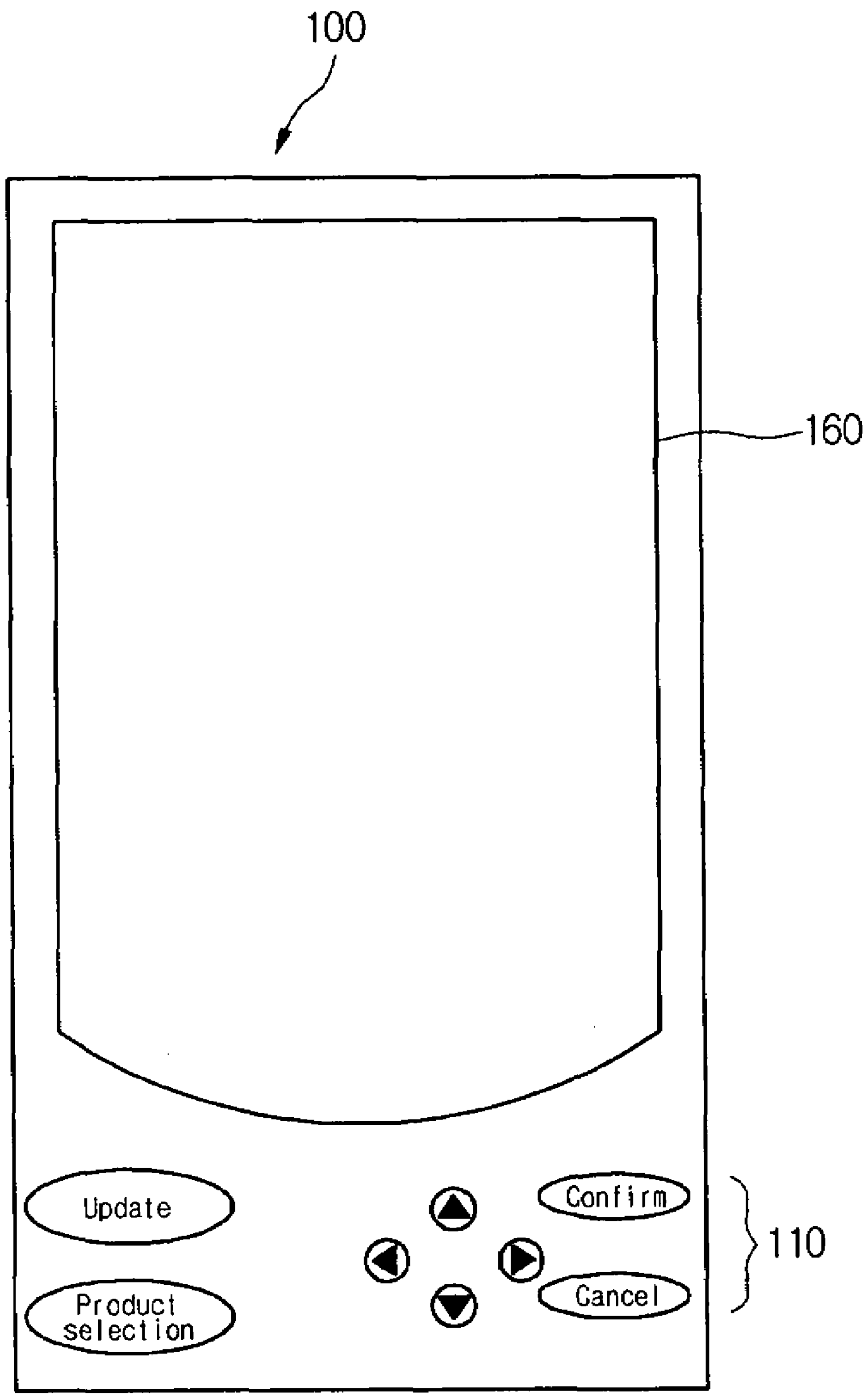
FIG. 5 is a layout of a universal remote controller according to the present invention.

FIG. 5 is a layout of a universal remote controller according to the present invention.

In controlling a plurality of electronic products by a remote controller, a key arrangement plan for each of the products is different based on remote controller control information.

Hence, the key arrangement plan is changed to fit control characteristics for each of the products and the changed key arrangement plan is displayed. So, the present invention employs a touch-screen type display means 160 for enabling a user's key input via the displayed key arrangement plan.

And, a key input unit 110 is provided for a selective control of a basic operation of a remote controller module 100.

In doing so, the display unit 160 includes a display device such as LED (light emitting diode), EL (electroluminescence), LCD (liquid crystal display), and the like.

And, infrared transmission is used for data communications between the remote controller module 100 and the electronic product module 200.

A method of implementing a unified remote controller according to the present invention is explained I detail with reference to FIG. 6 as follows.

Referring to FIG. 6, once a user inputs the update key provided to the key input unit 110 of the remote controller module 100 within a range of a predefined distance from the electronic product module 200, the remote controller control unit 120 recognizes the corresponding key input to output a request signal of information associated with the product and model for a remote controller control to the electronic product module 200 via the transmitting unit 140 (S100).

Once the information request signal is received via the receiving unit 210 of the electronic product module 200 from the remote controller module 100, the system control unit 230 of the electronic product module 200 transmits the remote controller control information associated with the entire products and models such as unique identification numbers of remote controller keys, product codes, and the like to the remote controller module 100 via the transmitting unit 220 (S110).

In doing so, the remote controller unit 120 of the remote controller module 100 receives the product code information of the respective electronic products and then decides whether the received product code information exists in the memory unit 130.

As a result of the decision, if the product code information of the respective electronic products exists in the memory unit 130 of the remote controller module 100, a corresponding confirmation signal Yes is transmitted to the electronic product module 200 (S120).

And, the electronic product module 200 transmits an acknowledgment signal ACK for releasing the remote controller control information reception according to the confirmation signal Yes of the remote controller module 100 (S130).

Meanwhile, if the product code information of the respective electronic products fails to exist in the memory unit 130 of the remote controller module 100, a corresponding confirmation signal No is transmitted to the electronic product module 200 (S200).

In this case, the electronic product module 200 recognizes that there exists no product code information for at least one product in the remote controller module 100 and then transmits a key code update request signal to the remote controller module 100 (S210).

Subsequently, in case of receiving the key code update request signal from the electronic product module 200, the remote controller module 100 displays a predefined message to enable a user to decide whether to execute an update.

If the user allows the update execution, the remote controller module 100 transmits a corresponding confirmation signal Yes to the electronic product module 200 (S220).

In accordance with the confirmation signal transmitted from the remote controller module 100, The electronic product module 200 then transmits the remote controller control information of the product such as the key code information, key arrangement plan, and the like to the remote controller module 100 by frame unit (S230).

So, the remote controller control unit 120 receives the remote controller control information of the electronic product by frame unit and then transmits an acknowledgment signal to the electronic product module 200.

Figure 7A:
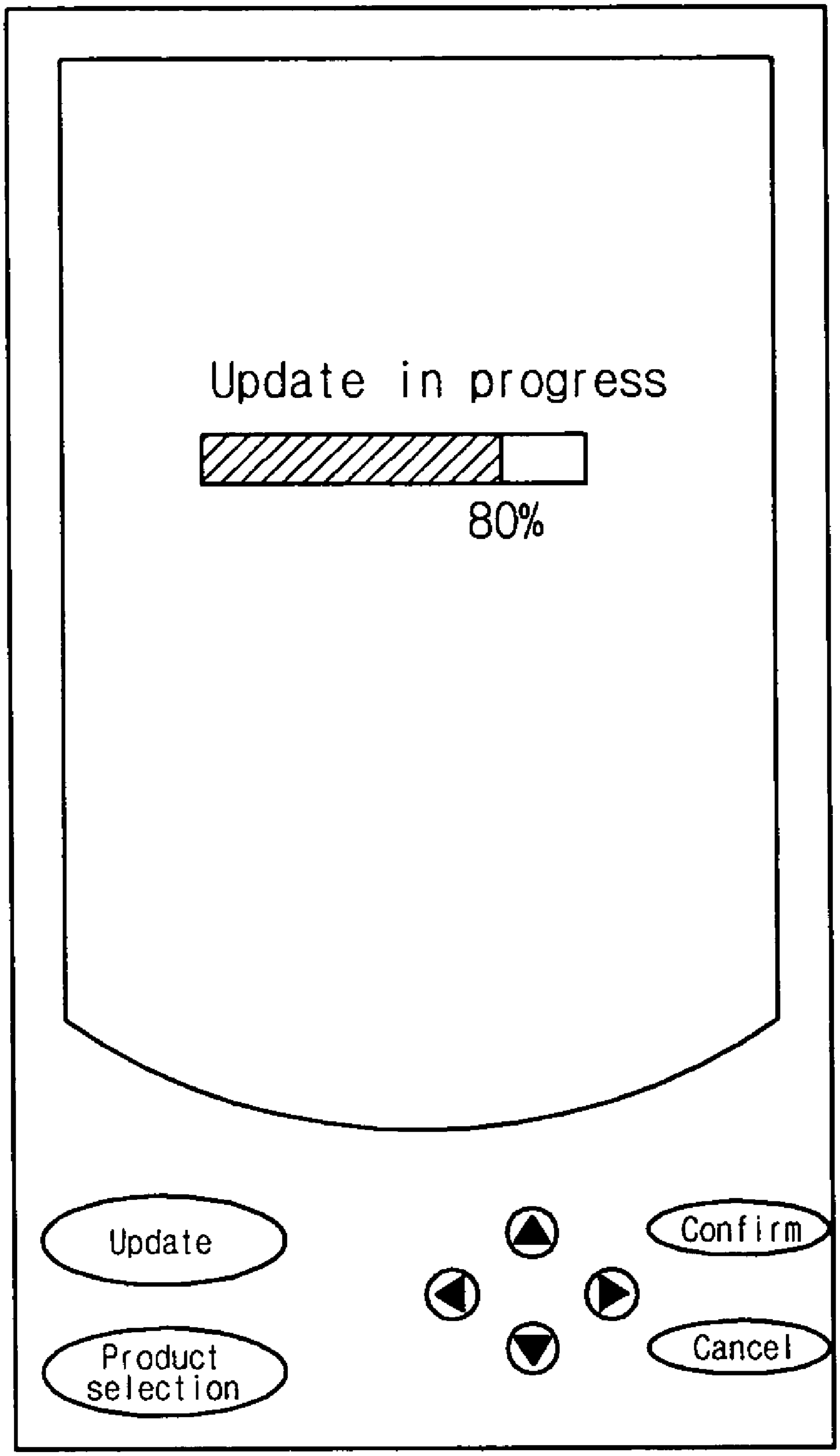
FIGS. 7A to 7C are diagrams of a screen of an electronic product for explaining a key code update process.

In doing so, the remote controller control unit 120, as shown in FIG. 7A, displays an update progress image on a screen via the display unit 160.

Figure 7B:
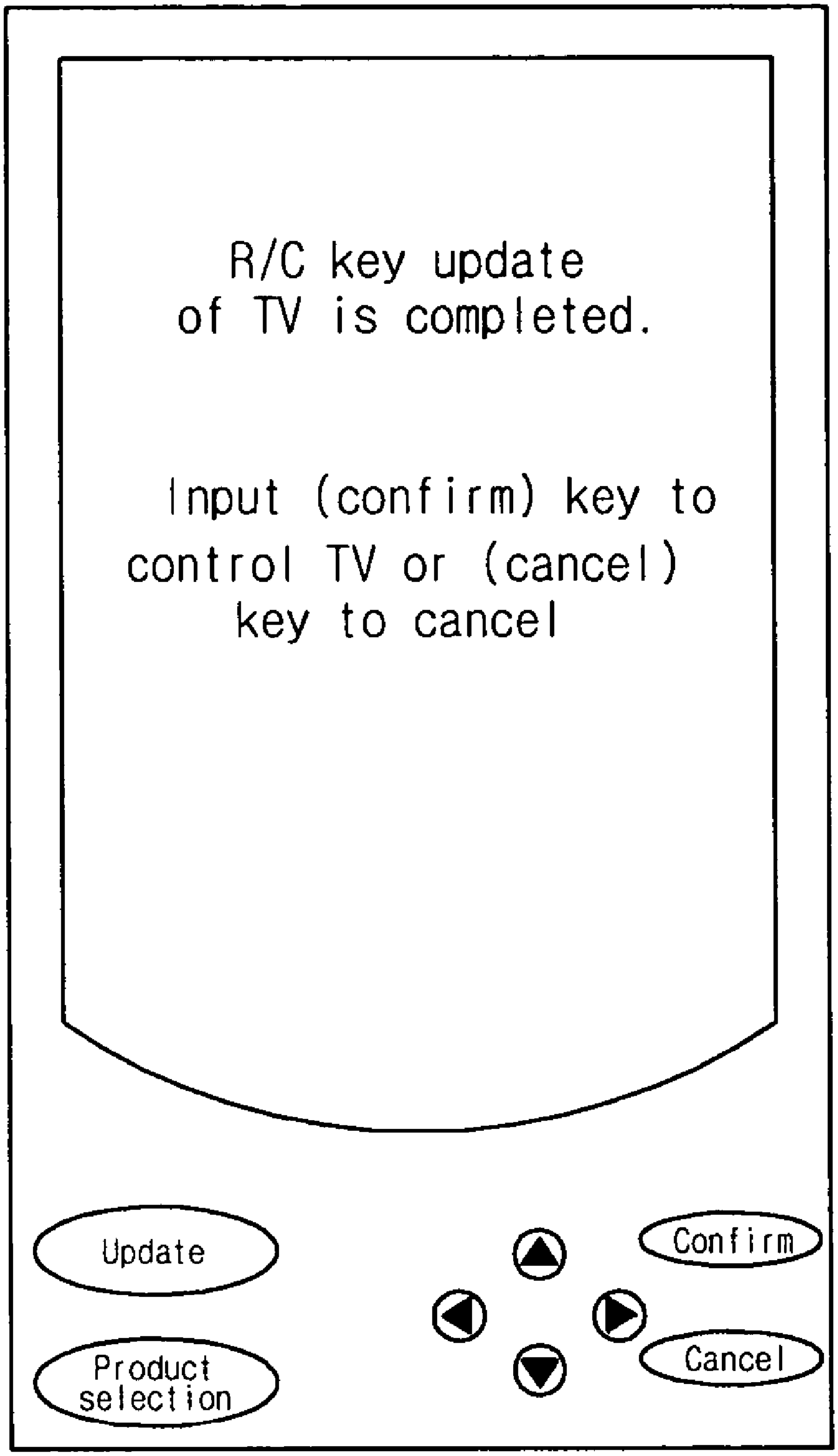

Subsequently, in case of receiving an EOF (end of file) signal from the electronic product module 200 together with the remote controller information of a last frame, the remote controller control unit 120 stores the received remote controller information in the memory unit 130 (S240) and then displays a message indicating an update completion as shown in FIG. 7B.

Figure 7C:
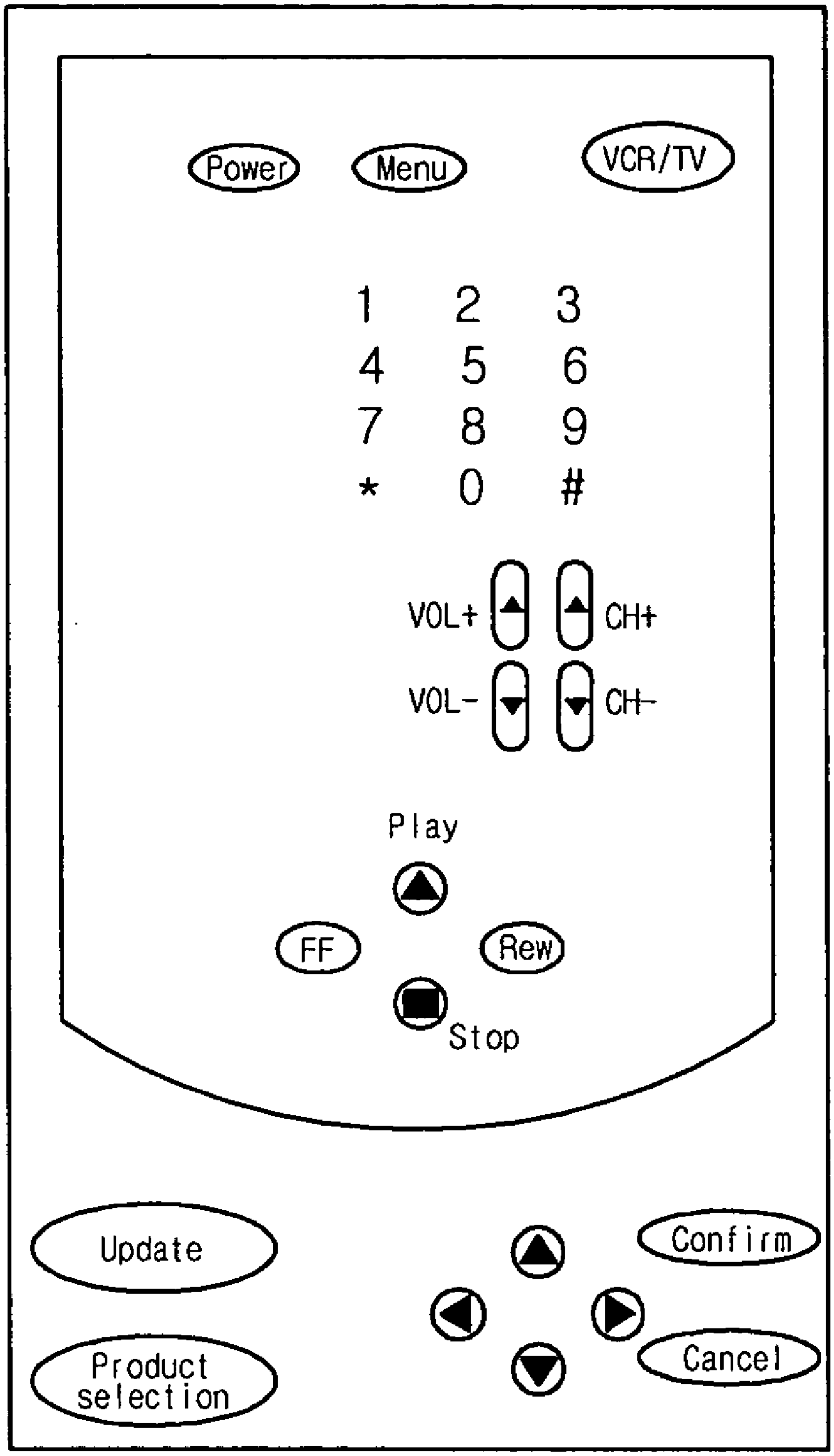

In doing so, if the user requests a remote controller operation for the updated electronic product 200, the current key arrangement plan of the operated remote controller module 100 and the key code are simultaneously changed based on the stored remote controller information so that the changed key arrangement plan, as shown in FIG. 7C, can be displayed via the display unit 160.

Once the user selects/inputs a key button via the key arrangement plan displayed on the display unit 160 of the remote controller module 100, the remote controller control unit 120 detects the key button input to output the corresponding key code to the electronic product module (S250).

Meanwhile, as another embodiment of the present invention, if the product information outputted from the electronic product module 200 fails to exist in the remote controller module, it can be set up that the remote controller control information is automatically outputted to the remote controller module to be stored therein.

As mentioned in the above description, the remote controller information update process is carried out on the entire electronic home appliances so that the remote controller information of the respective electronic products can be stored in the memory unit 130.

Figure 8:
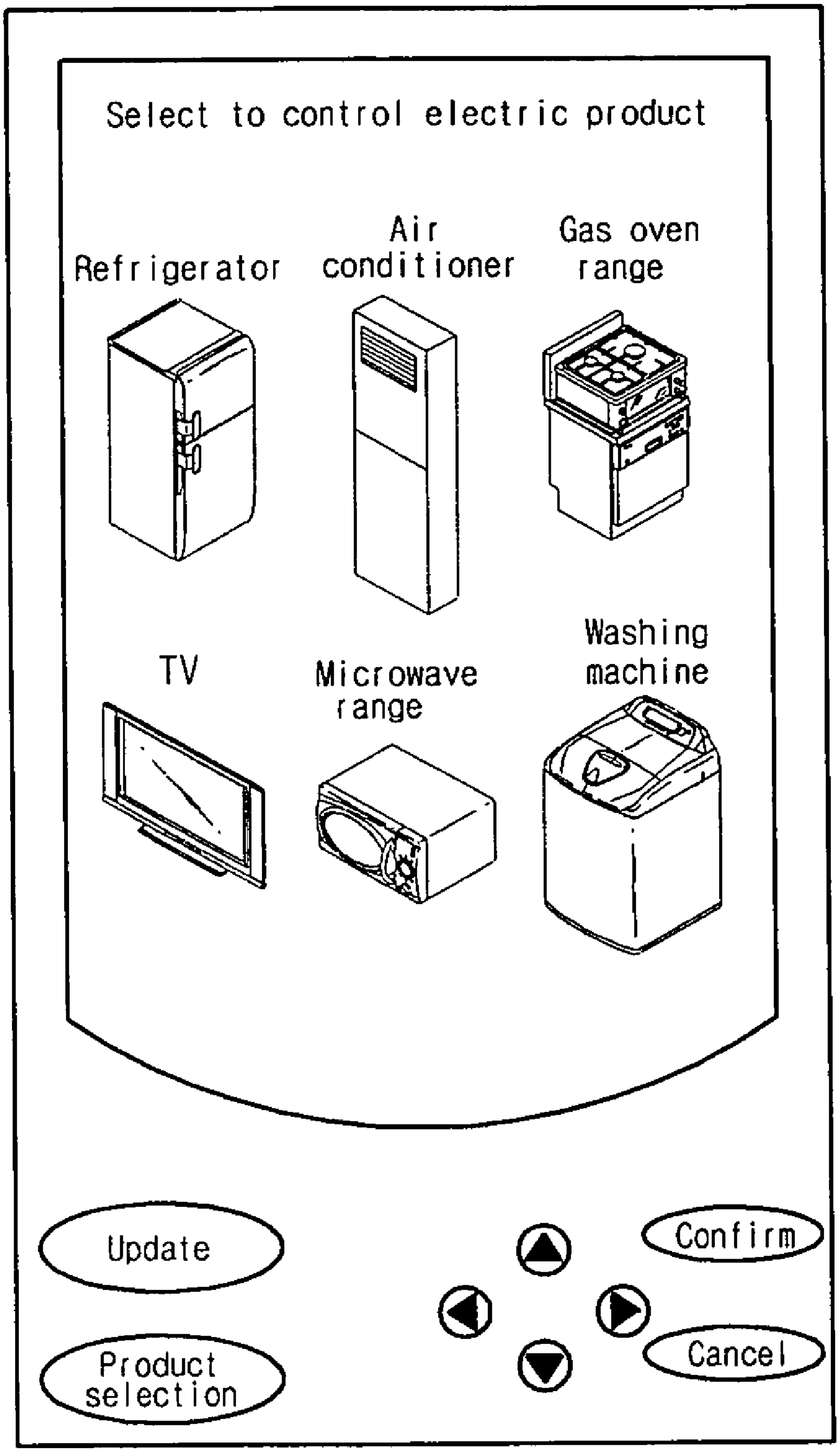
FIG. 8 is a diagram of a screen of an electronic product for showing an electronic product selection.

Hence, as shown in FIG. 8, if the user selects the electronic product to be controlled via the product selecting unit of the remote controller module 100, the remote controller control unit 120 recognizes the corresponding selection to read the remote controller information of the corresponding electronic product from the memory unit 130.

After the current key code and the key arrangement plan have been changed according to the read-in remote controller information, the changed key arrangement plan is provided to the user via the display unit 160, which is shown in FIG. 7C for example.

Namely, in case that the user requests the remote controller operation for the specific product of the electronic product module 200, the remote controller control information (e.g., key code information, key arrangement plan, etc.) of the corresponding electronic product 200 from the memory unit 130 to designate the key code to an active area start address of the remote controller module 100 and to change the key arrangement plan simultaneously.

Once the user inputs a command or function key to be controlled via the displayed key arrangement plan, the key code corresponding to the inputted key is outputted to the corresponding electronic product module 200.

For instance, in case that the user elected TV via the electronic selection image, the current key code of the remote controller module 100 is changed into the key code of TV and the key arrangement plan is changed to provide the key arrangement plan (FIG. 7C) to the user via the display unit 160.

In doing so, keys including control functions of the respective products are arranged on the key arrangement plan and the corresponding key will be displayed by the remote controller control information for the respective products.

Figure 9:
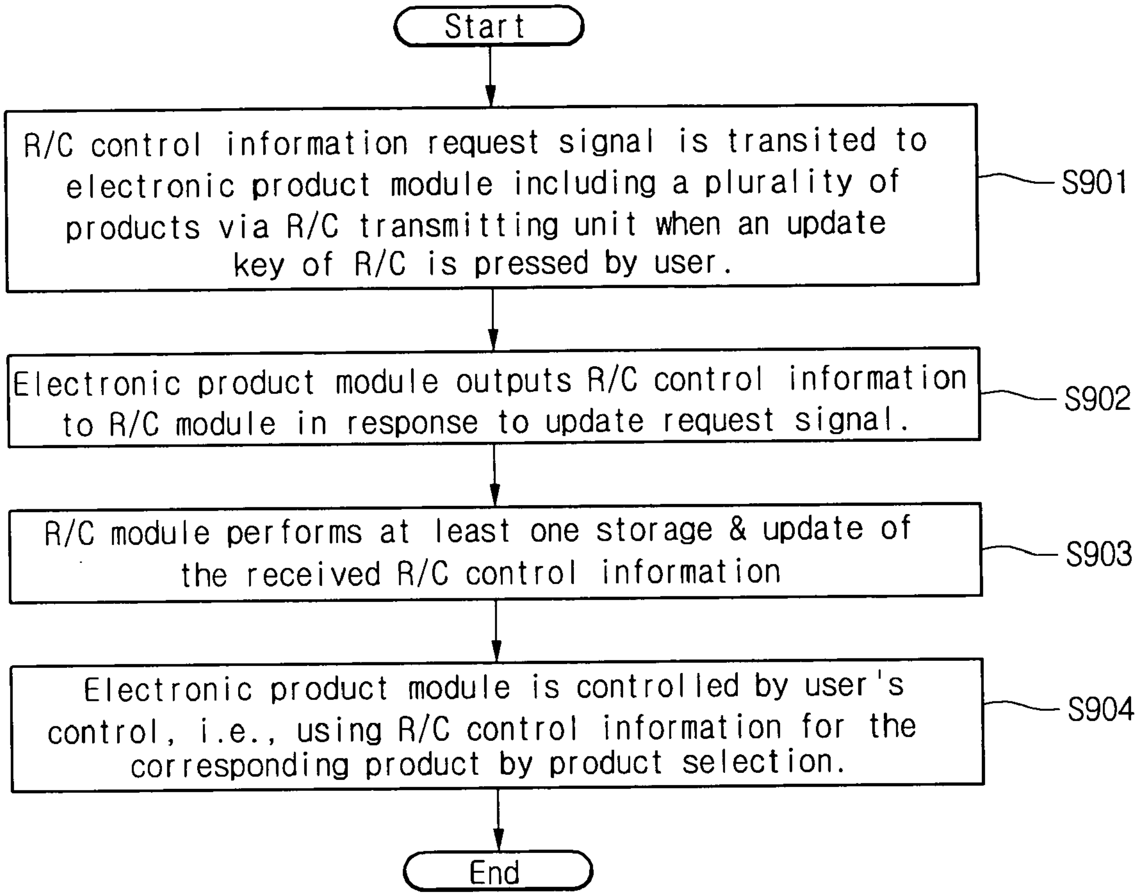
FIG. 9 is a schematic flowchart of an overall operation for implementing a universal remote controller according to the present invention.

FIG. 9 is a schematic flowchart of an overall operation for implementing a universal remote controller according to the present invention, in which an electronic product a user intends to control is controlled by a remote controller in a manner of storing to use remote controller control information outputted from an electronic product module in a memory unit of a remote controller module.

Referring to FIG. 9, once a user presses a specific key, i.e., update key, configured in the remote controller module 100, a remote controller control information request signal, i.e., a request signal for information for controlling a specific product using a remote controller, is transmitted to the electronic product module 200 including a plurality of products via the remote controller transmitting unit (S901).

The electronic product module 200 outputs remote controller control signal to the remote controller module 100 in response to the update request signal (S902).

Subsequently, the remote controller module 100 carries out storage and update on the received remote controller control information at least once (S903).

The update of the remote controller control information in the remote controller module 100 is a process of updating the control information (product information, unique remote controller key identification number, etc.) that has been previously stored, which means a case that the remote controller control information of the products of the electronic product module connected to an external network is updated and outputted, as assuming another embodiment of the present invention.

By the operation of the step S903, the remote controller module stores the remote controller control information.

By the user's control, i.e., by pressing a product selection key as a predefined key of the remote controller module, the respective products are displayed. By selecting one of the displayed products to be controlled, the selected product of the electronic product module 200 is controlled using the remote controller control information for the corresponding product stored in the memory unit (S904).

As another embodiment of the above operation, in displaying a key arrangement plan based on the remote controller control information for the product selected by the user, the products are grouped to be displayed by considering product characteristics, a specific product is selected, and a key arrangement plan for the selected product can be displayed.

Figure 10A:
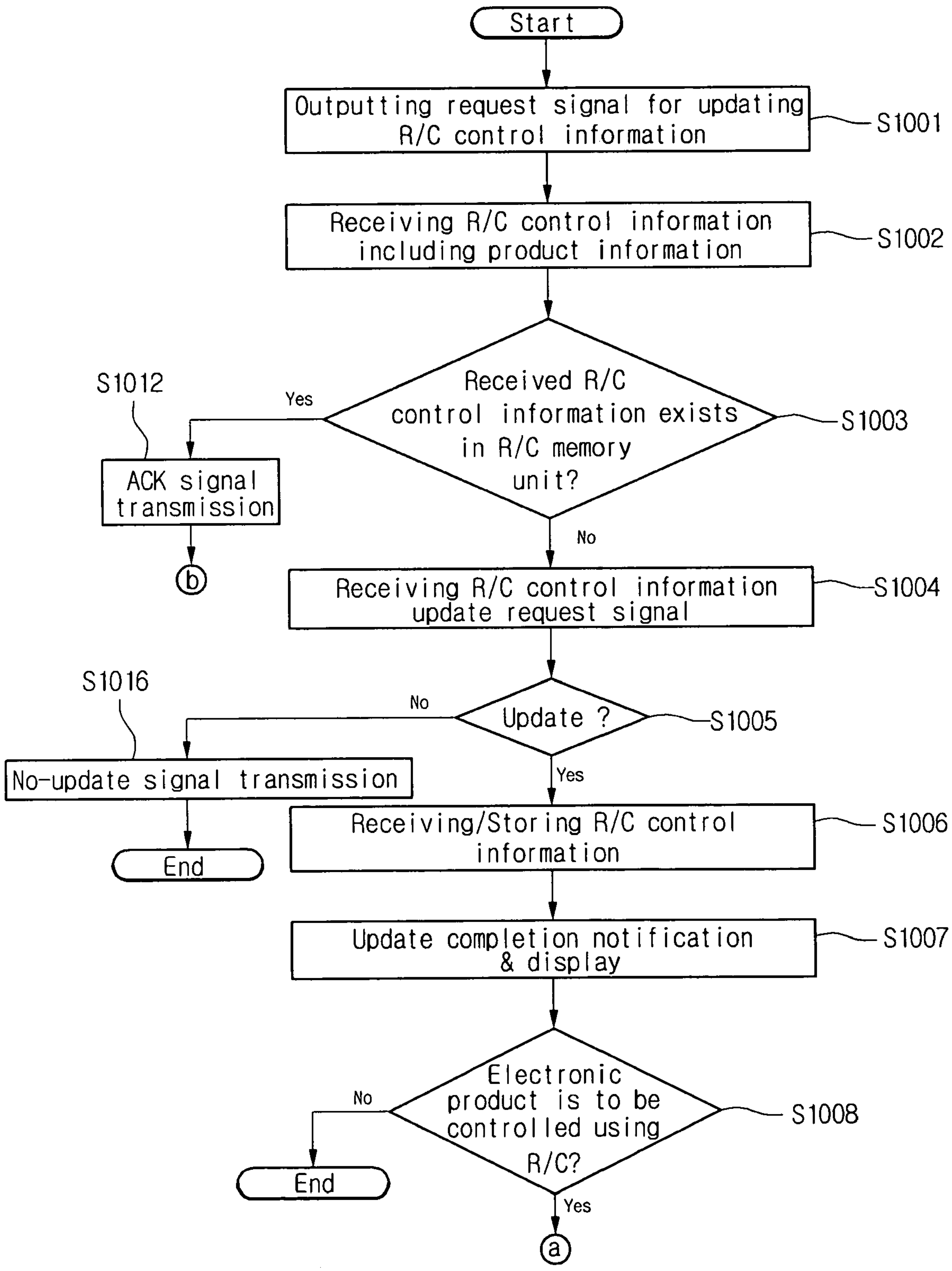
FIGS. 10A to 10C are flowcharts of an operation in a remote controller module.
Figure 10B:
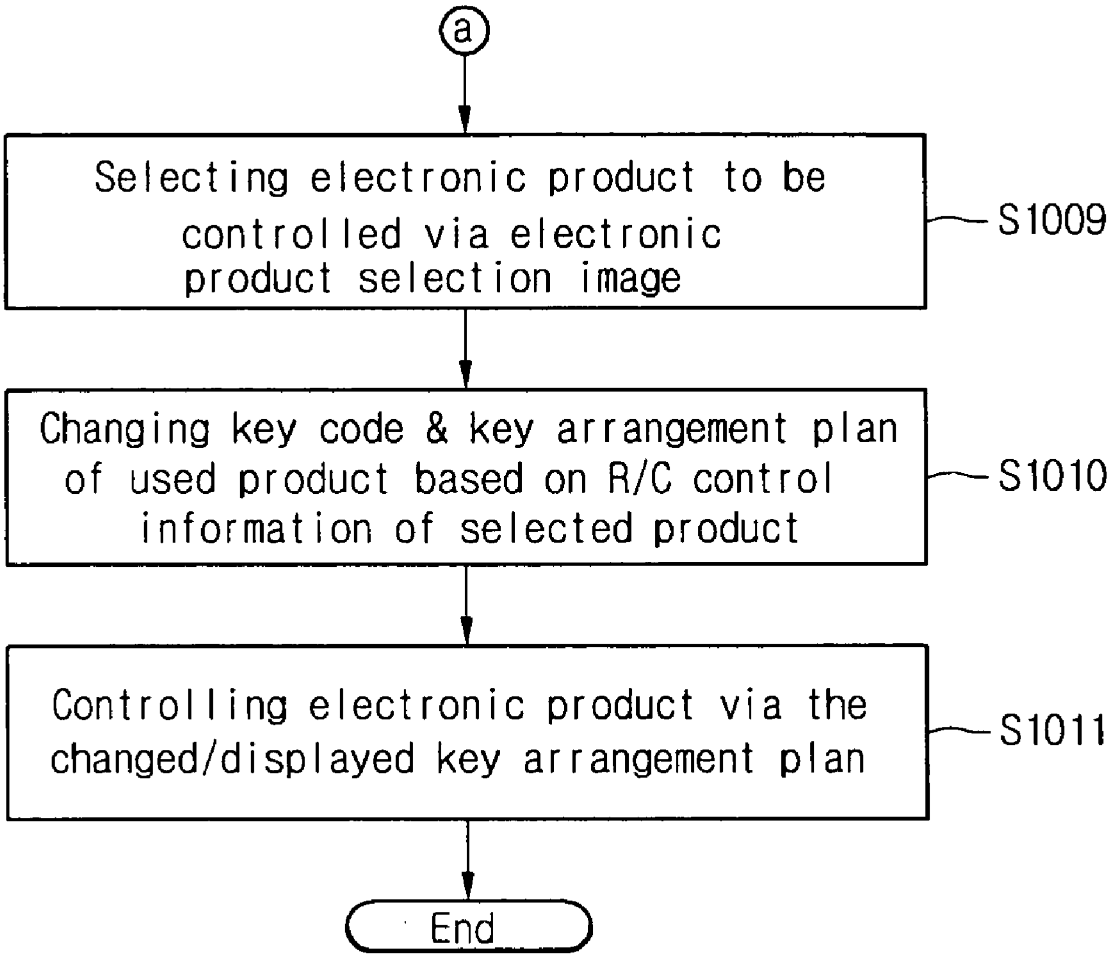
Figure 10C:
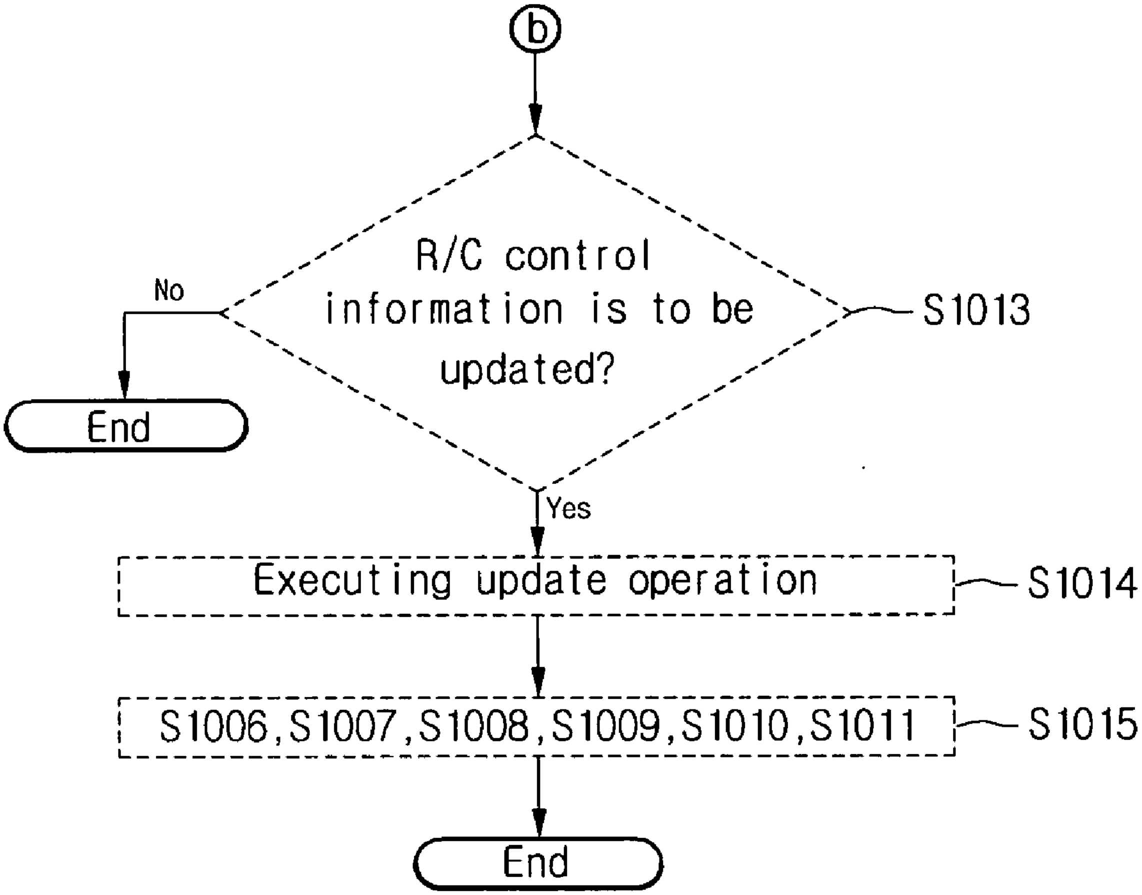

FIGS. 10A to 10C are flowcharts of an operation in a remote controller module.

First of all, by pressing an update key as a predefined specific key of a remote controller module, a request signal for a remote controller control information update is outputted to an electronic product module (S1001).

Remote controller control information including product information is received from the electronic product module (S1002).

It is decided whether the received remote controller control information exists in a memory unit of the remote controller module (S1003). If the received remote controller control information fails to exist in the memory unit, an update is carried out by receiving the remote controller control information update request signal outputted from the electronic product module (S1004, S1005).

By receiving the remote controller control information, the electronic product module is informed of the completion of storage and update (S1006, S1007).

After completion of the remote controller control information update, it is decided whether an electronic product is to be controlled using a remote controller. If it is decided to control the electronic product, a user presses a product selection key as a predefined specific key to display a plurality of electronic products on a display unit and then selects a specific one of the displayed electronic products (S1008, S1009).

Based on the remote controller control information of the selected electronic product, a key code and key arrangement plan of a previously displayed product are changed into new ones to be outputted (S1010).

By pressing a specific key to be controlled in the changed/outputted key arrangement plan, the corresponding electronic product is controlled (S1011).

Meanwhile, as a result of the decision step S1003, if the received remote controller control information exists in the memory unit of the remote controller module, it is decided whether the currently stored remote controller control information is to be updated. If it is to be updated, the display and update of the corresponding electronic product are carried out at least once (S1014, S1015).

The steps S1014 and S1015 follow the concept of another embodiment of the present invention.

After completion of the steps S1014 and S1015, the same procedures of the steps S1005 to S1011 are repeated.

Figure 11:
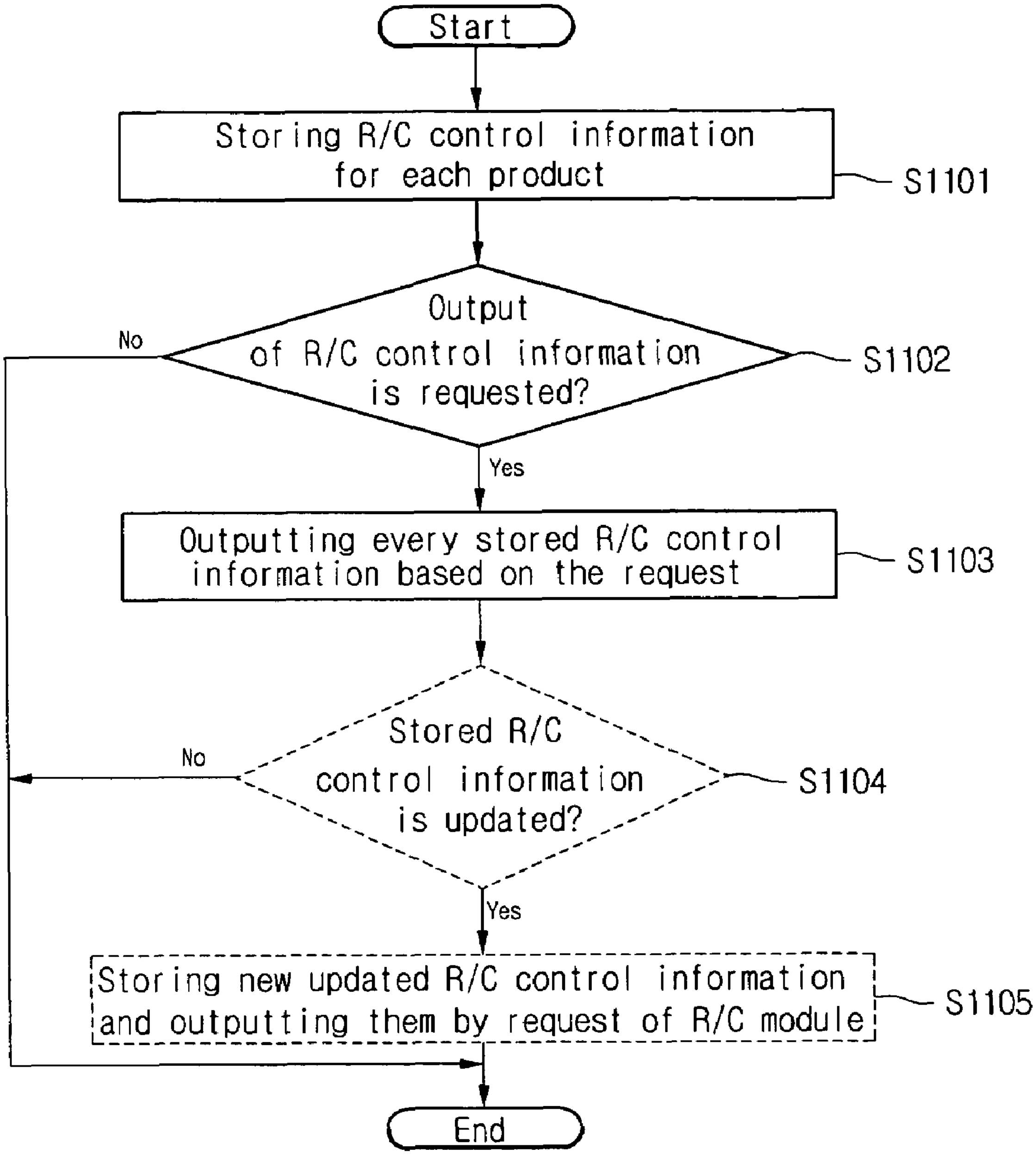
FIG. 11 is a flowchart of an operation in an electronic product module.

FIG. 11 is a flowchart of an operation in an electronic product module.

First of all, for the storage and output of remote controller control information in an electronic product module including a plurality of products, the remote controller control information for each product is stored (S1101).

In case the output of the remote controller control information is requested by a remote controller module, the entire stored remote controller control information is outputted (S1102, S1103).

Alternatively, as another embodiment of the present invention, regardless of a request signal of the remote controller module, it can be set up that control information of the corresponding stored electronic product can be automatically outputted on booting the electronic product.

Meanwhile, as another embodiment of the present invention, when the previously stored remote controller control information is linked to an external network (not shown in the drawing) to be updated, the updated remote controller control information is automatically outputted to the remote controller module or is outputted to the remote controller module based on a request (S1104, S1105).

As explained in the foregoing description, the remote controller control information stored in the electronic product module is outputted to the remote controller module to enable one remote controller to remotely control the entire products listed in the electronic product module including a plurality of the products.

Accordingly, the remote controller module receives the information necessary for the control of each electronic product from the electronic product module to use, whereby the memory can be efficiently used since there is no need to previously store the remote controller control information of the entire electronic products.

And, the present invention facilitates to update the remote controller code information via data communications with electronic products even if the remote controller control information (e.g., remote controller code information, etc.) of the electronic product a user intends to use fails to exist in the memory unit of the remote controller module, thereby enabling to enhance system performance.

Moreover, the present invention enables one remote controller to control the entire electronic products using the remote controller information received from the electronic product module.

Moreover, in case of intending to update the remote controller control information of the remote controller module, by pressing the update key provided to the remote controller module for example, it is able to control each of the products using the entire remote controller information stored/updated in the electronic product module.

Further more, the present invention enables the electronic product module to access the external network. And, by updating the remote controller control information currently stored in the electronic product module, it is able to update the remote controller control information in the remote controller module as well.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. An apparatus for implementing a universal remote controller in a system including:

a remote controller module; and an electronic product module, wherein the electronic product module stores remote controller control information for controlling the electronic product module and automatically outputs the stored remote controller control information to the remote controller module when a product coupled to the electronic product module is booted up.

2. The apparatus of claim 1, wherein the electronic product module comprises:

a receiving circuit receiving at least one remote controller control information request signal and at least one key code from a remote controller module;

a transmitting circuit transmitting the remote controller control information for controlling the electronic product module to the remote controller module, the remote controller control information including at least one of product code information, key code data, or key arrangement state information;

a memory circuit storing the remote controller control information; and a system control circuit connected to the receiving, transmitting, and memory circuits to output the stored remote controller control information according to the request signal and controlling the system to perform an operation corresponding to the received key code.

3. The apparatus of claim 1, wherein the remote controller control information stored in the electronic product module is simultaneously outputted based on an external request.

4. The apparatus of claim 1, wherein the electronic product module is linked to an external network to update the remote controller control information thereof.

5. The apparatus of claim 1, wherein the remote controller module receives the remote controller control information from the electronic product module and controls the electronic product module using the received remote controller control information.

6. The apparatus of claim 1, wherein the remote controller control information includes at least one of product code information, key code data or key arrangement state information.

7. A remote controller module comprising:

a transmitting circuit performing at least one transmission of a remote controller control information request signal or a key code according to an electronic product module;

a receiving circuit receiving remote controller control information including key arrangement state information for controlling the electronic product module;

a memory circuit storing the remote control information for at least one or more electronic products;

a display performing at least one display of the electronic products or a key arrangement plan corresponding to the remote controller control information of the electronic product; and a control circuit receiving the remote controller control information from the receiving unit to store in the memory circuit, changing a current key code and key arrangement plan based on the remote controller control information of the product selected, and then outputting the key code corresponding to a key input to the electronic product module, wherein the control circuit automatically receives the remote controller control information when a product coupled to the electronic product module is booted up.

8. The remote controller module of claim 7, wherein the remote controller control information is received in response to a request by a predefined specific key input or in response to booting the system.

9. The remote controller module of claim 7, wherein the display unit of the remote controller comprises a touch-screen type display means.

10. The remote controller module of claim 7, wherein the display means includes at least one of LED, EL, and LCD.

11. The remote controller module of claim 7, wherein the display unit comprises a plurality of keys set up according to operations or control characteristics of a plurality of usable products, respectively.

12. The remote controller module of claim 7, wherein the at least one or more products are grouped to be selected in receiving the remote controller control information or controlling the at least one or more products.

13. A method, comprising:

automatically receiving remote controller control information from an electronic product module when a product coupled to the electronic product module is booted up;

displaying a key arrangement plan of the electronic product module to be controlled by a selection based on the received remote controller control information; and outputting key information to the electronic product module when a key of the displayed key arrangement plan is selected, the output key information causing a function to be performed by the product.

14. The apparatus of claim 13, wherein the remote controller control information includes at least one of product code information, key code data or key arrangement state information.

15. A method, comprising:

automatically receiving, in a remote controller module, remote controller control information sent from an electronic product module when a product coupled to the electronic product module is booted up;

storing the received remote controller control information;

displaying the key arrangement plan based on the remote controller control information received from the electronic product module; and outputting a key code corresponding to an input of a key displayed on the key arrangement plan.

16. The method of claim 15, further comprising:

controlling the electronic product remotely based on the outputted control information.

17. The method of claim 15, further comprising:

by operating a predefined specific key, outputting a remote controller control information request signal to the electronic product module;

if the request signal is received from the remote controller module, transmitting the remote controller control information by frame unit to the remote controller module from the electronic product module; and receiving the remote controller control information transmitted from the electronic product module in the remote controller module.

18. The method of claim 15, further comprising:

receiving remote controller control information by pressing an update key on the remote controller module.

19. A method, comprising:

automatically receiving, in a remote controller module, remote controller control information including key arrangement state information from an electronic product module when a product coupled to the electronic product module is booted up;

deciding whether the received remote controller control information exists in a memory unit of the remote controller module;

if the received remote controller control information fails to exist in the memory unit, updating the remote controller control information outputted from the electronic product module; and informing the electronic product module of completion of updating the remote controller control information.

20. The method of claim 19, further comprising:

after the completion of updating the remote controller control information, deciding whether to control electronic products via the remote controller;

if a specific one of the electronic products is decided to be controller as a result of the deciding, displaying a plurality of the electronic products on a display unit by the operation of the predefined specific key;

selecting the specific electronic product from a plurality of the displayed electronic products;

outputting a display image by the remote controller control information of the selected electronic product; and controlling the corresponding electronic product by pressing a key to be controlled on a key arrangement plan of the outputted display image.

21. The method of claim 19, further comprising:

if the remote controller control information received from the electronic product module exists in the memory unit, deciding whether to update the remote controller control information currently stored; and if the remote controller control information is decided to be updated as a result of the deciding step, displaying and updating the corresponding electronic product at least once.

* * * * *